United States Patent
Kaule et al.

(10) Patent No.: US 6,376,017 B1
(45) Date of Patent: Apr. 23, 2002

(54) METHOD AND DEVICE FOR PRODUCING A FOIL MATERIAL

(75) Inventors: Wittich Kaule, Emmering; Gregor Grauvogl, Munich, both of (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/319,936

(22) PCT Filed: Nov. 20, 1998

(86) PCT No.: PCT/EP98/06617

§ 371 Date: Aug. 20, 1999

§ 102(e) Date: Aug. 20, 1999

(87) PCT Pub. No.: WO99/20447

PCT Pub. Date: Apr. 29, 1999

(30) Foreign Application Priority Data

Oct. 20, 1997 (DE) .......................................... 197 46 268

(51) Int. Cl.[7] .................................................. B41M 3/14
(52) U.S. Cl. ........................... 427/271; 427/8; 427/271; 427/278; 427/359; 427/285.5; 427/398.2
(58) Field of Search ................................. 427/278, 271, 427/316, 375, 385.5, 398.2, 8, 7, 359; 118/688, 102, 101, 202, 211

(56) References Cited

U.S. PATENT DOCUMENTS

| 4,552,165 | A | * | 11/1985 | Luska ............................ 137/3 |
| 4,629,647 | A | * | 12/1986 | Sander ........................ 428/172 |
| 5,750,186 | A | * | 5/1998 | Frazzitta ...................... 118/688 |
| 5,807,456 | A | * | 9/1998 | Kaule ........................... 156/230 |
| 5,840,088 | A | * | 11/1998 | Yang et al. .................... 51/295 |
| 5,863,306 | A | * | 1/1999 | Wei et al. ..................... 51/295 |

FOREIGN PATENT DOCUMENTS

| EP | 0 686 509 | * | 6/1995 |
| WO | 91/17050 | * | 11/1991 |
| WO | 94/15752 | * | 7/1994 |
| WO | 96/00255 | * | 1/1996 |
| WO | 98/30361 | * | 7/1998 |

* cited by examiner

*Primary Examiner*—Shrive P. Beck
*Assistant Examiner*—Kirsten A. Crockford
(74) *Attorney, Agent, or Firm*—Bacon & Thomas

(57) ABSTRACT

The invention relates to a method for producing a foil material wherein a plastic foil is provided with a lacquer layer having variable viscosity, and a relief structure is then embossed into the lacquer layer. At least during application of the lacquer layer and during the embossing process the viscosity of the lacquer layer is adjusted to a predetermined value and kept constant during the particular phase of operation. The invention fixer relates to an apparatus for carrying out this method.

12 Claims, 4 Drawing Sheets

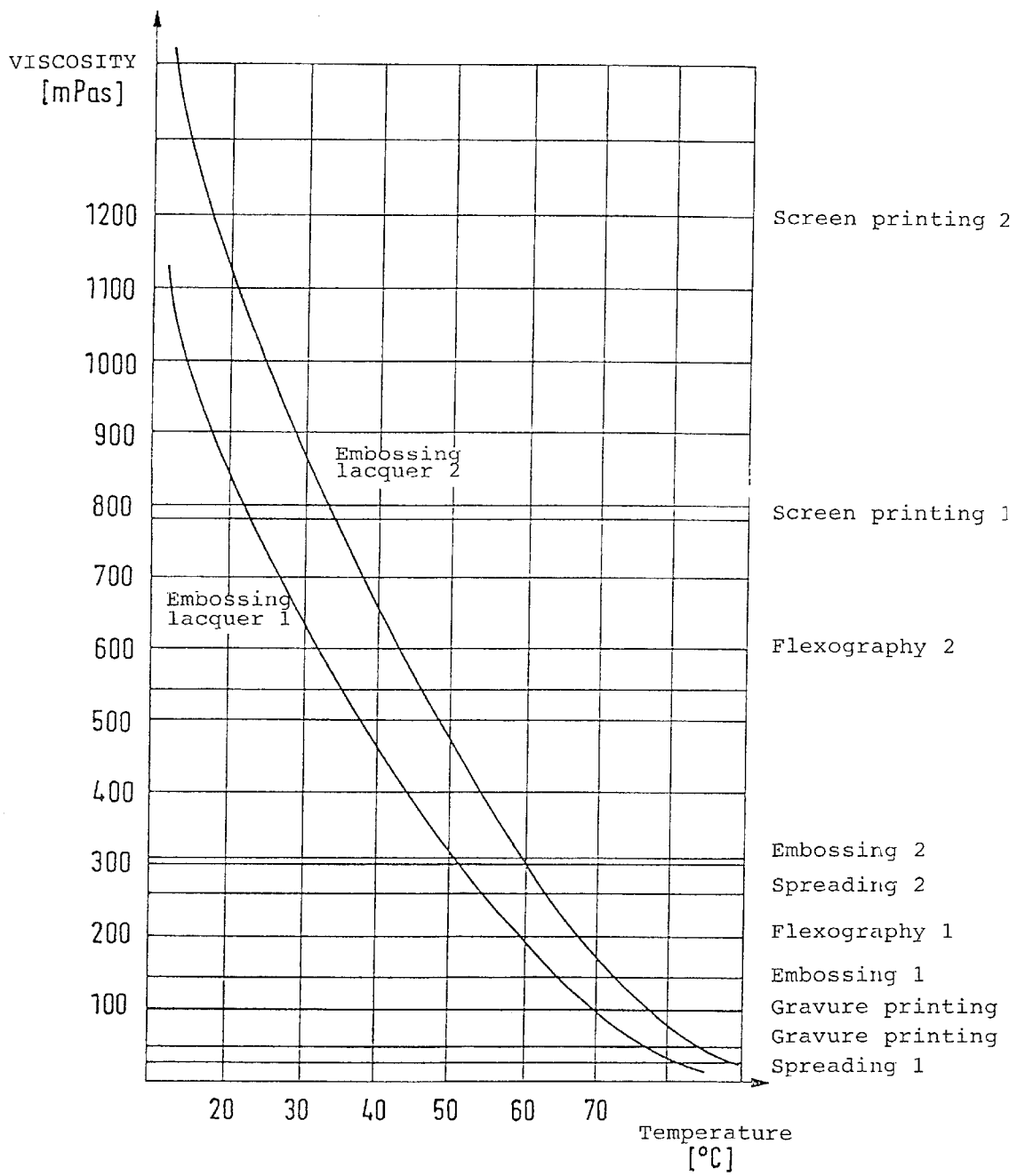

METHOD AND DEVICE FOR PRODUCING A FOIL MATERIAL

BACKGROUND OF THE INVENTION

1. Field of the Invention

This invention relates to a method for producing a foil material wherein a plastic foil is provided with a lacquer layer having variable viscosity, and a relief structure is then embossed into the lacquer layer. The invention further relates to an apparatus for producing a foil material having at least a device for applying a lacquer layer of variable viscosity to a plastic foil and a device for embossing the lacquer layer.

2. Related Art

Optically variable devices such as holograms, diffraction gratings, etc., have been used for some time as elements for protection from forgery or copying due to their optical properties varying with the viewing angle. For mass production of such elements it is usual to produce so-called "masters" having the particular phase information in the form of a three-dimensional relief structure. Starting out from this master one produces by duplication so-called "embossing dies" which are used to emboss the diffraction structures into a lacquer layer in long runs. Such embossed holograms are usually prepared on a separate carrier and transferred by an adhesive layer to the final object to be protected against falsification, such as document, passport, credit card, CD, book, etc. The carrier layer can be removed from the layer structure of the hologram after the latter has been glued to the object to be protected.

The carrier material with the security device disposed thereon is frequently referred to as a transfer band and can be produced for example by the method known from U.S. Pat. No. 4,758,296. Therein, a sheetlike embossing die circulating on rollers is provided with a liquid resin and contacted with a plastic carrier material. During contact the liquid resin is cured by UV or electron beam. In a further step the relief structure is provided with a thin metal layer so that the information contained in the diffraction structures becomes visible in reflected light. For transfer of the diffraction structures to a security document, the layer structure is finally provided with a hot-melt adhesive layer which is activated under the action of heat and pressure.

However, it has turned out that transfer bands often have defects, i.e. places where no embossing lacquer is present or the embossing was not transferred sufficiently to the lacquer so that the brilliance of the diffraction effect is greatly restricted.

SUMMARY OF THE INVENTION

The invention is based on the problem of providing a method and apparatus which permit production of transfer bands without defects.

The invention is based on the finding that the various method steps during production of the transfer band place different requirements on the viscosity of the embossing lacquer, and therefore the viscosity must be adjusted in each method step and kept constant throughout the phase of operation for optimum results.

If the embossing lacquer is applied to the plastic foil by screen printing for example, viscosity must be between about 700 and 1500 mPas, by flexography about 100 to 500 mnPas or by gravure printing about 50 to 150 mpas, depending on the embossing lacquer used, to permit a uniform layer of desired thickness to be transferred to the foil. Which printing process is used depends on the layer thickness to be applied. Gravure printing can produce layer thicknesses of about 0.5 microns to about 3 microns, flexography about 3 microns to about 6 microns, and screen printing about 6 microns to about 12 microns. Since the lacquer is only applied in the form of a screen in printing operations, one must subsequently make sure the lacquer is distributed uniformly over the surface of the plastic foil. For this phase of operation the lacquer should be as fluid as possible; while for the embossing process a somewhat more viscous lacquer is advantageous. Hitherto the chemical composition of the lacquer and thus its viscosity were therefore selected so as to meet all requirements to a large extent. One had to accept the fact that the lacquer did not have the optimum viscosity for the particular phase of operation due to fluctuating working temperatures so that defects occurred in the finished product.

According to the invention, the viscosity of the lacquer is checked via a control unit in each phase of operation and adjusted to the optimum value for the particular phase. If lacquers with temperature-dependent viscosity are used, this control unit can consist of a temperature sensor and a heating or cooling assembly. The temperature sensor measures the temperature of the embossing lacquer continuously or at certain intervals and passes on the result to a regulating unit which controls the heating or cooling assembly in accordance with the measured temperature. The heating or cooling assembly can be in continuous operation so that the regulating unit merely provides a power increase or decrease, or the regulating unit causes a switch-on or switch-off of the assembly.

DESCRIPTION OF THE DRAWINGS

Further advantages and embodiments of the invention will be explained with reference to the figures, in which:

FIG. 4 shows viscosity curves of two different embossing lacquers as a function of temperature.

FIG. 1 shows the devices essential to the invention in the inventive apparatus for producing a foil material. It has device 10 for applying lacquer layer to plastic foil 12, spreading path 20 and device 30 for embossing lacquer layer 11. The apparatus can also have further devices such as a device for metalizing the embossed lacquer surface.

DETAILED DESCRIPTION OF PREFERRED EMBODIMENTS OF THE INVENTION

Figure 1:
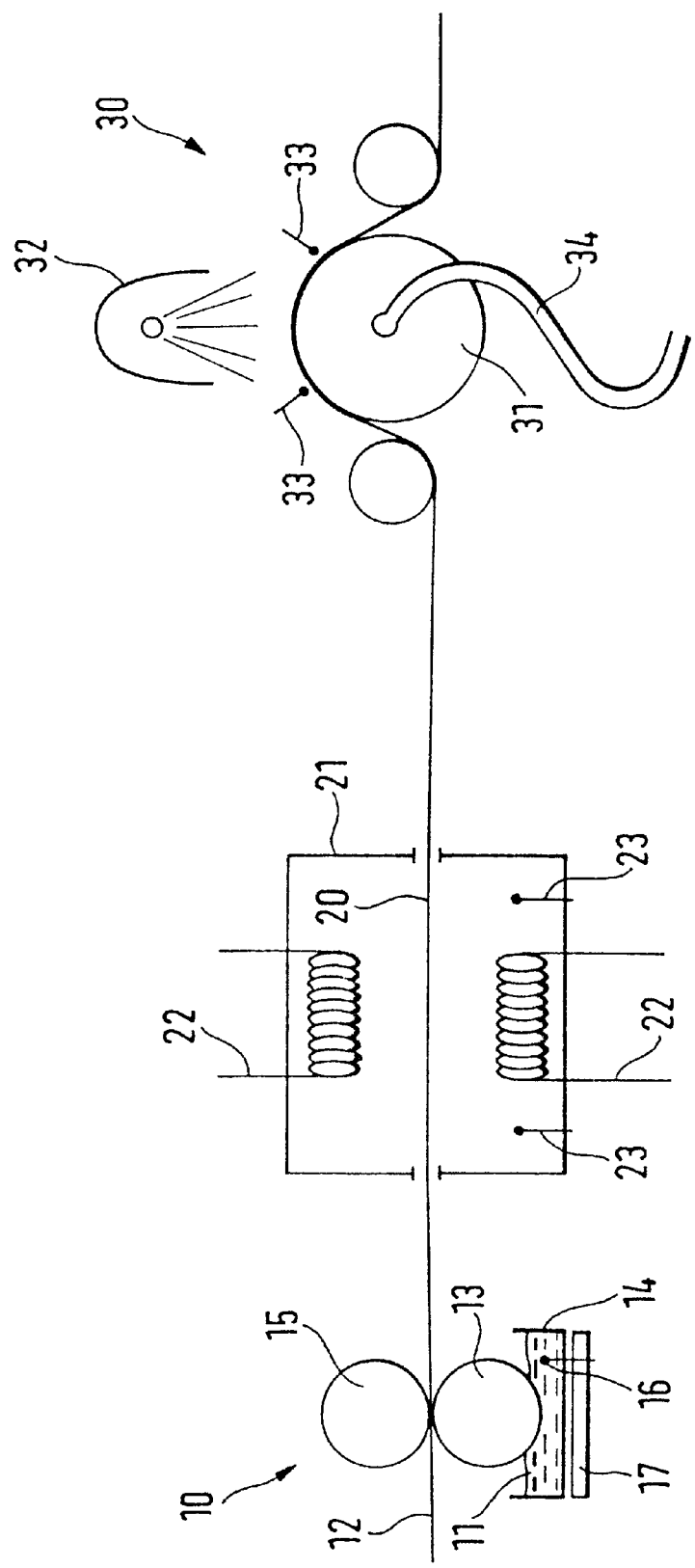
FIG. 1 shows an embodiment of an apparatus, according to the invention

Device 10 for applying lacquer layer 11 as shown in FIG. 1 is a gravure printing unit. Printing cylinder 13 has a surface engraved in the form of depressions of various depths. When passing through ink tub 14 said depressions receive the ink or lacquer which is subsequently transferred to foil 12 in the area of counterpressure cylinder 15. Ink tub 14 has temperature sensor 16 for checking the temperature of lacquer 11. Sensor 16 is connected via a regulating unit with heating plate 17 which heats ink tub 14 as required. Spreading path 20 designates a transport path of predetermined length which is located in heated box 21 where the lacquer spreads flat. The heating assembly is indicated here by heating spirals 22. One or more temperature sensors 23 are also disposed along spreading path 20 for checking the temperature of the lacquer and passing on the measuring results to a regulating unit (not shown) for regulating the temperature of box 21. Device 30 for embossing the lacquer layer preferably consists of embossing roll 31 whose surface bears the negative of the relief structure to be transferred. Said relief structure can be for example a diffraction structure in the form of a hologram, cinegram or the like. During contact of embossing roll 31 with lacquer 11 the lacquer must be hardened at least to the extent that the embossing structure is retained identically without being blurred. If the lacquer is curable with UV radiation for example, lacquer 11 must be cured in the area of the embossing roll by exposure to UV radiation. This is indicated by lamp 32 in FIG. 1. In the wrapping area between foil 12 and embossing roll 31 there are one or more temperature sensors 33 which check the temperature of lacquer layer 11 here too. If lacquer 11 is curable radically with UV radiation, as indicated in the embodiment shown, the embossing roll must usually be cooled with the aid of cooling assembly 34 in order to achieve the optimum viscosity. This can be done for example by passing a cooling liquid through the embossing cylinder, as indicated in FIG. 1.

Figure 2:
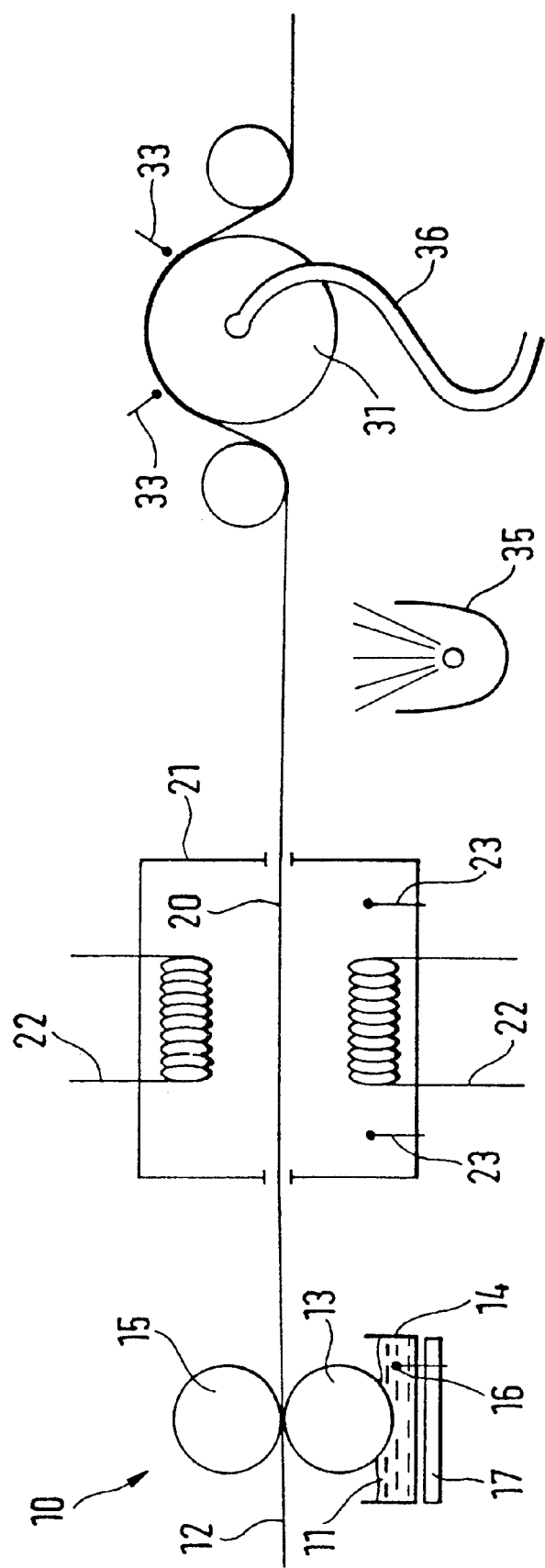
FIG. 2 shows further embodiments of the inventive apparatus.

If a cationically curable lacquer is used, however, the curing process must be initiated before the embossing process by means of UV radiation for example. This case is shown in FIG. 2. UV lamp 35 is disposed before embossing device 30. Since no additional heat is supplied by a radiation source during the embossing process in this embodiment, embossing roll 31 might have to be heated with the aid of heating assembly 36 in this case. This may involve for example passing a heating liquid through embossing roll 31.

The heating or cooling assemblies shown are merely examples. One can also use any other tempering methods, such as IR radiators and hot-air or cooling-air assemblies. The tempering methods associated with the individual phases of operation can of course be varied. Thus, the flow tempering indicated in the embossing device can also be used in inking cylinder 13 of printing unit 10. What is crucial according to the invention is that the viscosity is optimized by suitable tempering in the particular phases of operation as required.

Depending on the tempering method used, it is not absolutely necessary to dispose the spreading path in a box. The spreading path might possibly be dispensed with if the lacquer layer is applied, not with a printing unit, but with flat-working application systems ensuring a uniform layer from the start, such as roll coaters, slit nozzles or lacquer spraying systems.

Also, the invention is not restricted to the use of UV-curable lacquers. Any other lacquers can be used, e.g. thermoplastic or multicomponent lacquers. One can also use solvent-containing lacquers having components with temperature-dependent viscosity.

Figure 3A:
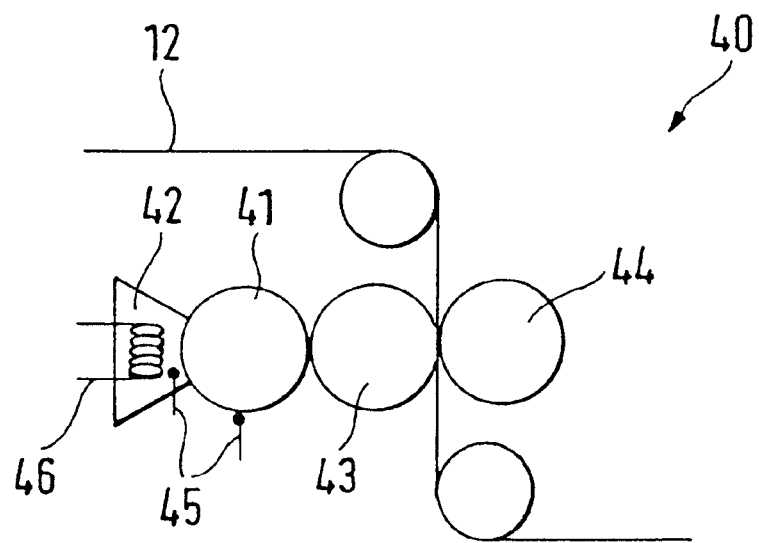
FIGS. 3a, 3b show variants of the inventive apparatus.
Figure 3B:
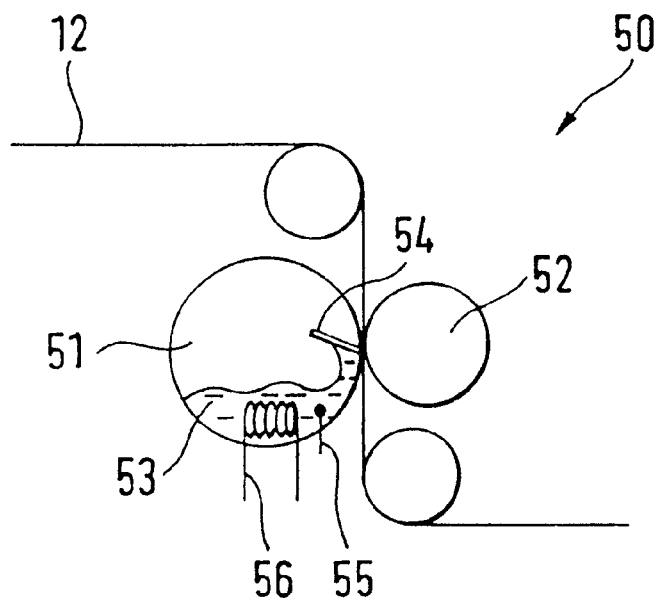

Instead of a gravure printing unit one can also use according to the invention flexographic or screen printing units, as shown in FIGS. 3a and 3b.

FIG. 3a shows flexographic printing unit 40. The surface of inking cylinder 41 is inked via ink chamber 42 and the ink subsequently transferred to letterpress cylinder 43 bearing the motif to be printed. In the area of counterpressure cylinder 44 the ink or lacquer layer is finally transferred to foil sheet 12. In the area of inking cylinder 41 and ink chamber 42 there are one or more temperature sensors 45 for checking the temperature of the lacquer layer and controlling the temperature of the lacquer in ink chamber 42 via a regulating unit (not shown). Heating assembly 46 required therefor is indicated by a heating spiral in FIG. 3a.

FIG. 3b shows screen printing unit 50 consisting substantially of screen printing cylinder 51 and counterpressure cylinder 52. The screen printing cylinder is a fabric material provided with openings only in the area of the printed image to be transferred. In the interior of screen printing cylinder 51 there is ink or lacquer layer 53 which is printed on foil sheet 12 through the mesh openings with the aid of squeegee 54. Sensor 55 is located here in the area of ink 53 in the interior of screen printing cylinder 51, as is tempering assembly 56 likewise indicated here by a heating spiral.

According to the invention the temperature of the lacquer system used must be adjusted and kept constant in each phase of operation so that the optimum viscosity for this phase results. When applying the lacquer by screen printing for example one can achieve optimum results with viscosities of about 700 to 1500 mPas depending on the lacquer. When applying it by gravure printing, however, one requires a viscosity of about 50 to 150 mPas for an optimum printing result, and by flexography about 100 to 500 mnPas. In the area of the spreading path the lacquer layer must be especially fluid in order to ensure uniform distribution of the lacquer layer over the total foil. The required viscosity depends in addition on the length of the spreading path. With a short spreading path one requires a viscosity of less than 100 mPas for example, while with a long spreading path a few 100 mPas can be necessary. Finally, during the embossing process the viscosity of the lacquer must be between 100 and 500 mPas depending on the lacquer system.

The viscosity value to be actually adjusted not only depends on the phase of operation to be performed but also varies greatly in accordance with the lacquer used. This is because each lacquer shows different rheological behavior under shear stresses as occur in all phases of operation. Some lacquers become more viscous through shear stress, others more fluid. This means that the optimum viscosity for the particular phase of operation must first be determined for each lacquer. As soon as this has been done the corresponding temperature to be adjusted can be read off the viscosity/temperature curve.

FIG. 4 shows the viscosity curves of two different embossing lacquers 1, 2 as a function of temperature. One can also see the optimum viscosities for the particular embossing lacquer and particular phase of operation. This results in the following viscosity and temperature values permitting optimum results for the particular lacquer:

| | Embossing lacquer 1 | |
|---|---|---|
| Phase of operation | Optimum viscosity [mPas] | Temperature to be adjusted [° C.] |
| Gravure printing | 50 | 76 |
| Flexography | 200 | 58 |
| Screen printing | 780 | 23 |
| Spreading | 25 | 80 |
| Embossing | 150 | 65 |

| | Embossing lacquer 2 | |
|---|---|---|
| Phase of operation | Optimum viscosity [mPas] | Temperature to be adjusted [° C.] |
| Gravure printing | 98 | 77 |
| Flexography | 540 | 47 |

-continued

Embossing lacquer 2

| Phase of operation | Optimum viscosity [mPas] | Temperature to be adjusted [° C.] |
|---|---|---|
| Screen printing | 1200 | 18 |
| Spreading | 270 | 63 |
| Embossing | 310 | 59 |

If one uses UV-curable embossing lacquer 1 in the apparatus shown in FIG. 1, it follows from the above table that embossing lacquer 1 must be kept at a temperature of about 76° C. in gravure printing unit 10 and heated further to about 80° C. for optimum spreading along spreading path 20. During the embossing process, however, the embossing lacquer temperature must be adjusted to about 65° C. Vis-à-vis normal room temperature one would thus likewise require a heating assembly, contrary to flow cooling 34 shown in FIG. 1. Since radically curable UV lacquers are cured by exposure to UV radiation during tie embossing process and the UV lamp itself also supplies heat and might heat the lacquer to temperatures of about 130° C., however, cooling must usually be performed during the embossing process. With the use of cationically curing lacquers one must instead perform heating during the embossing process, as explained above with reference to FIG. 2, in order to obtain the optimum viscosity.

With the use of embossing lacquer 2 one has different temperature values but also different viscosity values in accordance with the table. This is due, as explained above, to the different rheological properties of the lacquers under shear stress. Thus the optimum viscosity for embossing lacquer 2 (98 mPas) is higher with gravure printing than for embossing lacquer 1, while the temperature to be adjusted (77° C.) corresponds virtually to that for embossing lacquer 1.

Tempering is preferably done with computer control in that the temperature sensor or sensors of the particular device pass on the temperature values found to a central processing unit which evaluates the measured values and compares them with setpoints. Depending on whether the measured values are above or below the set-point, the heating or cooling power of the tempering assembly must be adapted.

What is claimed is:

1. A method for producing a transfer foil material which has optical diffraction structures wherein said method comprises the following steps:

providing a lacquer of variable viscosity and a plastic foil; and adjusting and maintaining the viscosity of said lacquer in an applying device to a first predetermined viscosity value where the lacquer is in a liquid state and applying said adjusted liquid lacquer to said plastic foil to produce a liquid lacquer layer;

adjusting the viscosity of said liquid lacquer layer to a second predetermined viscosity value where the lacquer is in a liquid state by embossing said liquid lacquer layer with an embossing device which is maintained at a constant temperature.

2. The method according to claim 1, wherein the lacquer has temperature-dependent viscosity and the first and second predetermined viscosity values are adjusting the temperature of the lacquer.

3. The method according to claim 1, including monitoring the temperature of the lacquer with the aid of a temperature sensor and regulating the temperature via heating and cooling assemblies during each adjusting step.

4. The method according to claim 1, including carrying out the step of applying the liquid lacquer to the plastic foil by printing the lacquer on the plastic foil using a printing process selected from the group consisting of screen printing, gravure printing and flexography, and during the printing operation heating at least parts of a printing unit used for carrying out the selected printing process.

5. The method according to claim 1, including after producing the liquid lacquer layer on the plastic foil, distributing the liquid lacquer layer uniformly over the surface thereof.

6. The method according to claim 5, wherein the liquid lacquer is distributed by spreading.

7. The method according to claim 5, including heating the liquid lacquer layer during the distributing step.

8. The method according to claim 1, including cooling the liquid lacquer layer during the embossing step.

9. The method according to claim 1, including using a radically or cationically curing lacquer during the lacquer application step.

10. The method of claim 1 which further comprises adapting said liquid lacquer layer embossed on said plastic foil into a security device.

11. The method of claim 10, wherein said liquid lacquer layer embossed on said plastic foil is adapted into said security device by curing and coating the cured embossed lacquer layer with a metal layer whereby information contained in said embossed lacquer layer becomes visible in reflected light.

12. The method of claim 10 which further comprises adhering said security device to a document whereby a security document is produced.

* * * * *